United States Patent
Berger et al.

(10) Patent No.: US 7,374,511 B2
(45) Date of Patent: May 20, 2008

(54) METHOD AND DEVICE FOR OPERATING ESPECIALLY AN AUTOMATIC OR AUTOMATED GEARBOX COMPRISING A PARKING BRAKE AND A RUNAWAY LOCKING MECHANISM

(75) Inventors: Reinhard Berger, Buehl (DE); Alexander Schweizer, Walzbachtal-Joehlingen (DE); Dietmar Lang, Hoeheischweiler (DE); Klaus Kuepper, Buehl (DE); Burkhard Pollak, Buehl (DE); Juergen Benz, Oeberkirch (DE)

(73) Assignee: LuK Lamellan und Kupplungsbau Beteiligungs KG, Buehl (DE)

( * ) Notice: Subject to any disclaimer, the term of this patent is extended or adjusted under 35 U.S.C. 154(b) by 0 days.

(21) Appl. No.: 11/703,415

(22) Filed: Feb. 7, 2007

(65) Prior Publication Data

US 2007/0135261 A1 Jun. 14, 2007

Related U.S. Application Data

(62) Division of application No. 10/904,392, filed as application No. PCT/DE03/01464 on May 7, 2003.

(30) Foreign Application Priority Data

May 10, 2002 (DE) ............................... 102 20 903

(51) Int. Cl.
F16H 59/74 (2006.01)
(52) U.S. Cl. .......................................... 477/99; 74/335
(58) Field of Classification Search .................. 477/99; 74/335
See application file for complete search history.

(56) References Cited

U.S. PATENT DOCUMENTS

| | | | | |
|---|---|---|---|---|
| 4,295,540 A | * | 10/1981 | Hildebrecht | ................. 180/271 |
| 4,462,487 A | * | 7/1984 | Warwick et al. | ......... 192/219.7 |
| 5,839,084 A | * | 11/1998 | Takasaki et al. | ............... 701/67 |
| 6,059,687 A | | 5/2000 | Durieux et al. | ................ 477/94 |
| 6,196,078 B1 | | 3/2001 | DeJonge et al. | ......... 74/473.12 |
| 6,213,911 B1 | * | 4/2001 | Salecker et al. | ............... 477/97 |
| 6,533,705 B1 | | 3/2003 | Giefer et al. | .................. 477/96 |
| 6,588,294 B1 | | 7/2003 | Rogg | ....................... 74/473.21 |
| 6,629,024 B2 | * | 9/2003 | Tabata et al. | .................. 701/22 |
| 6,976,569 B2 | | 12/2005 | Khaykin et al. | ......... 192/220.4 |

FOREIGN PATENT DOCUMENTS

| | | |
|---|---|---|
| DE | 19955016 | 5/2001 |
| EP | 0376661 | 4/1993 |
| EP | 0814287 | 12/1997 |
| JP | 642614 | 2/1994 |

\* cited by examiner

*Primary Examiner*—Ha D. Ho
(74) *Attorney, Agent, or Firm*—Simpson & Simpson, PLLC

(57) ABSTRACT

Methods and devices for actuating a parking brake in a gearbox which is actuated in an automated manner, whereby gear changes are carried out using at least one electrically driven actuator, gear positions can be selected by using a selector device, and the parking brake can be activated by using the selector device when the vehicle is stationary or moving slowly. A vehicle provided with an additional gearbox. An ignition key can only be removed, when the gearbox is in a P state and the additional gearbox is not in the N state. A further method and device, whereby the additional gearbox can only be shifted in the N state when the gearbox is not in the P state. Further methods and a device in which automated manual gearboxes, especially parallel gearboxes, are controlled in such a way that the vehicle can be safely parked.

7 Claims, 11 Drawing Sheets

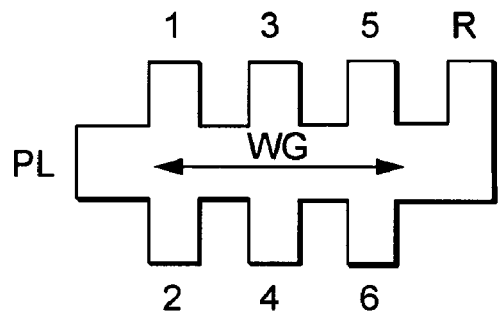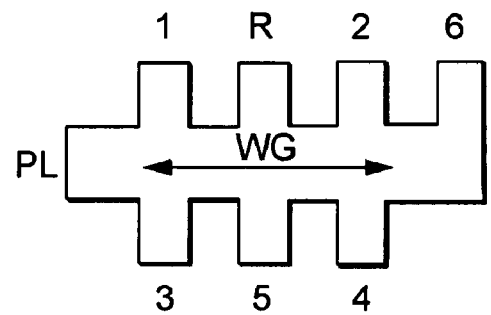
Fig. 5          Fig. 6
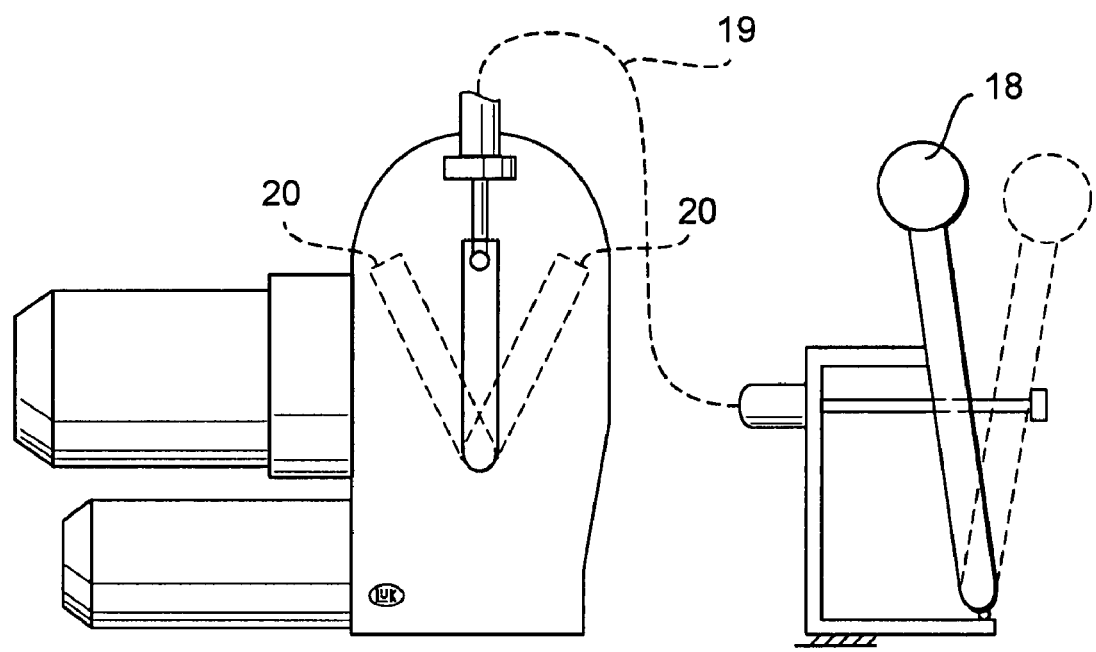
Fig. 7

METHOD AND DEVICE FOR OPERATING ESPECIALLY AN AUTOMATIC OR AUTOMATED GEARBOX COMPRISING A PARKING BRAKE AND A RUNAWAY LOCKING MECHANISM

CROSS-REFERENCE TO RELATED APPLICATIONS

This application is a division of U.S. patent application Ser. No. 10/904,392, filed Nov. 8, 2004, now U.S. Pat. No. 7,204,785 which was filed under 35 U.S.C. §120 and §365 (c) as a continuation of International Patent Application PCT/DE03/01464, filed May 7, 2003, which application is incorporated herein by reference. This application also claims priority of German Patent Application 102 20 903.0, filed May 10, 2002, which application is incorporated herein by reference. The subject matter of the above priority applications including drawings is incorporated by reference in its entirety.

FIELD OF THE INVENTION

The invention relates to a method for controlling the removability of an ignition key, a method for controlling the operability of an additional transmission, a method for setting or operating a parking lock of a vehicle equipped with an automated-shift transmission, a method for the enabling a starting operation in a vehicle equipped with an automated-shift transmission and devices for carrying out the method.

BACKGROUND OF THE INVENTION

Transmissions for motor vehicles have already become known in multiple versions. Manual-shift transmissions, in which the driver manages the gear change, have been and continue to be widely used because of the cost advantage of such transmissions. In addition to these manual-shift transmissions operated by the driver, automatic transmissions have already become known that can be fully automatically shifted transmissions having a hydrodynamic converter and a transmission of the planetary type connected downstream thereof. Such known automatic transmissions are regularly equipped with a parking lock by which the output shaft of the transmission and with it the drivetrain can be blocked so that an unintended rollaway of the vehicle can be prevented. The automatic transmission is locked in this context in that the driver of the vehicle sets the selection lever in a position P, which causes the output shaft of the transmission to be blocked via actuation mechanics in the form of, for example, tie rods or connecting rods.

In addition to these known manual transmissions and the described automatic transmissions, using automated-shift transmissions has already become known in motor vehicles in which an actuator in the form of, for example, an electric motor or two electric motors is used for the select operation and shift operation in order to be able to carry out the gear change in a manner controlled by program or also as required by the driver.

The use, the comfort and the operating safety of vehicles, especially passenger vehicles, is decisively affected by the transmission. A prerequisite for fuel-efficient driving is driving at a low speed and an appropriately high torque. The greater the gear ratio spread allowed by the transmission and the simpler the shifting, the more this may be accomplished, which is why automatic and automated-shift transmissions are increasingly being used.

Such an automated-shift transmission with the actuators, the clutch for disengaging the drivetrain and the control devices for the operation of a transmission is designed as a "by-wire" system in which the actuator or actuators are driven via electronic control pulses and a mechanical force transfer path between the selection lever disposed in the vehicle and the transmission is no longer provided. Also, in such an automatically actuated transmission in the form of, for example, an automated-shift transmission or a twin-clutch transmission having two clutches and an actuating mechanism driven by electric motor, it is desirable to provide a parking lock so that the vehicle equipped with it may be prevented from unintentionally rolling away.

Moreover, for the operating safety of the vehicle, it is important that the ignition key may only be removed if the parking vehicle is parked in a secure braked or blocked state, and that this state may not be cancelled in an uncontrolled manner. For driving comfort it is important that the automated or automated-shift transmission spontaneously react to a driver-controlled removal of the securely braked or blocked state and that an immediate start be enabled without in the process causing lags, accelerations or bucking that is sensed by the occupants as a nuisance.

SUMMARY OF THE INVENTION

The object of the present invention is therefore to provide a method for resolving the aforementioned problem and for the actuation of a parking lock of an automatically actuated transmission and to provide a device to carry out the method.

This objective is achieved via a method for controlling the removability of an ignition key and for the actuation of a parking lock in a vehicle having an automatically actuated transmission in which gear changes are carried out via at least one actuator and transmission positions are selectable via a selector device, the transmission having a P operating mode that blocks the rotation of an output shaft and having an additional transmission disposed between the transmission and the vehicle wheels that activates the parking lock via the selector device or shifts into an N operating mode, in which its output shaft rotates freely while disengaged from the input shaft, when the vehicle is stationary or moving slowly, in which method the removability of the ignition key is only enabled if the transmission is in the P operating mode and the additional transmission is not in the N operating mode.

The transmission discussed here is not a conventional automatic transmission in the planetary style, rather, for example, a manual-shift transmission automated via "add-on actuating mechanism" or a parallel-shift transmission that is designed as a "shift-by-wire" system in which there is no longer any mechanical connection between the selector device and the transmission for the shifting of the gears.

The selector device may be a shift lever, with which the driver is able to select individual gears of the transmission, or also a shift program, according to which the transmission is then controlled via a transmission controller according to a shift program, or a separate shifter that causes an activation of the parking lock when the vehicle is stationary or moving slowly, whereby the speed may be less than, for example, 2 km/h.

According to a further development of the method of the invention, it is provided in this context that the parking lock be activated if a control pulse required for operation of the vehicle is detected as missing, that is, for example, it is detected via sensor that the ignition key was removed or, in an electronic access authorization system that works without such an ignition key, a keycard or the like is detected as missing.

According to a further development of the method, it is provided that the parking lock is activated if it is determined that the driver of the vehicle has left the vehicle and the selector device is located in a drive position. If, for example, the selection lever is located in a position according to which an automatically running shift program of the automatically actuated transmission has been selected and the driver has left the vehicle, which may be determined, for example, via a driver seat occupancy sensor, the parking lock is automatically activated according to the invention and the drivetrain of the vehicle is blocked so that the vehicle is prevented from rolling away.

The activation and also a deactivation of the parking lock, described in further detail below, may be carried out when the engine of a vehicle having an automatically actuated transmission with a parking lock is running as well as when it is stopped. The parking lock may be activated in this context via an electrically driven actuator that engages the parking lock, which is possible when there is normal function with appropriate power supplied to the actuator.

According to a further development of the method of the invention, it is also provided that the parking lock is activated after the determination of a fault situation. This fault situation may be a fault condition of the selector device in a drive position if it is thus determined that a signal originating from the selector device is implausible and it is determined that the vehicle engine has been stopped.

In a similar manner, the parking lock may be activated if a fault condition of the selector device is detected in a drive position and the vehicle is moving at a speed less than 2 km/h.

According to a further development of the invention, it is also provided that the parking lock is activated if a fault condition of a transmission control system is detected and the engine has been stopped. In this way, when a signal of the transmission control system is assessed as implausible and the engine is stopped, the vehicle is prevented from rolling away.

According to the invention, it is also provided to activate the parking lock if it is determined that the energy for operating the transmission has failed, thus, for example, the actuator is no longer provided with energy and the vehicle is stationary or is rolling at only a low speed of less than 2 km/h. For this case, it is advantageous if a spring energy accumulator is provided that automatically activates, or engages, a parking lock designed, for example, as a locking pawl if the aforementioned conditions are satisfied.

It is provided according to a further development of the method of the invention that the parking lock is deactivated if the service brake of the vehicle is operated and a drive position or a neutral position is selected via a selector device. The deactivation of the parking lock may actively be brought about in this context via the actuator for the execution of the gear change operations, it being possible to provide a holding actuator that holds the deactivated parking lock in a deactivated position.

Very generally, it is provided according to the invention that a deactivation of the parking lock may be brought about via the selector device in the vehicle, it being also possible to provide a mechanical linking of the selection lever to the parking lock in the automatically actuated transmission, also provided here for the deactivation, that is, a mechanical force transmission path between the selection lever and the parking lock is actuated via a displacement movement of the shift lever, which enables a disengagement of the parking lock so that a mechanical disengagement of the parking lock is enabled even when there is a failure of the energy necessary to operate the transmission actuator, which is advantageous if the vehicle is disabled by a breakdown.

The invention also creates a device for the operation of a parking lock of an automatically actuated transmission having a mechanical spring device that activates the parking lock and an electrically driven actuator controlled via a selector device that deactivates the activated parking lock and a holding actuator that keeps the deactivated parking lock deactivated. In other words, this means that according to the invention a device having a mechanical spring device is provided that is able to activate the parking lock automatically and the activated parking lock may be deactivated via an electrically operated actuator, it being possible for the driver of the vehicle to trigger the deactivation via a selector device and the parking lock, then deactivated, may be kept deactivated via an additional actuator, the holding actuator. The holding actuator may be, for example, an electromagnet that holds the parking lock in a deactivated state.

According to a further development of the device according to the invention, it is provided that the activated parking lock may be deactivated by an emergency unlocking device that is mechanically actuated via the selector device. In this way, a precaution is taken, for the case of the vehicle being disabled by a breakdown, in which the parking lock has been activated and a deactivation of the parking lock via the electrically operated actuator is no longer possible, and therefore the parking lock may be mechanically deactivated via an emergency unlocking device so that it is possible, for example, to tow the vehicle away.

A device is also provided according to the invention for actuating a parking lock of an automatically actuated transmission that has a selector device for the control of an electrically driven actuator that activates the parking lock, a spring device being provided against which the selector device may be moved for the activation of the parking lock, the actuator for the activation of the parking lock being controlled via the detection of the movement of the selector device and the selector device being locked after successful activation of the parking lock.

The selector device that can be moved against the spring device ensures that the driver noticeably discerns the activation of the parking lock via the necessary overcoming of the spring force and an unintentional activation of the parking lock by the driver is thus prevented. The movement of the selector device by the driver is detected and used for the activation of the parking lock via the actuator, the selector device then being locked after successful activation of the parking lock, for which a magnetic or mechanical lock is employed.

The method described below and the device described below may be used, for example, on a vehicle having a twin-clutch transmission with a starter generator. In a vehicle equipped with a twin-clutch transmission with parking lock, it is advantageous if the clutches are disengaged when the internal combustion engine is switched off. This specifically causes the rollaway locking mechanism to be in operation only when the parking lock is actually activated, and the case cannot occur wherein the vehicle can no longer be moved when the parking lock is deactivated, specifically if at least one clutch is engaged and no more energy is available to disengage the clutch, which could be the case, for example, if the vehicle battery can no longer provide sufficient energy for actuation of the clutch and the vehicle must be towed away. Therefore, the rollaway locking mechanism of the vehicle is in operation only when the parking lock is actually activated, but not in other gears.

Moreover, it is provided that the engagement of neutral in the transmission, in which all gears are disengaged, or the engagement of the reverse gear is only carried out if the driver's desire for these positions has been clearly verified. In this way it is prevented that either neutral or reverse is engaged if the selection lever is in this position only briefly. Because the internal combustion engine is cut off at the same time the parking lock is activated, in the twin-clutch transmission after a preceding forward drive first or second gear is engaged, both clutches are disengaged and the parking lock is activated. In this state, the vehicle can easily be moved after a deactivation of the parking lock, and in this way with the twin-clutch transmission the behavior of a fully automatically actuated transmission of the planetary type may be reproduced with converters.

A further solution of the object of the invention is achieved using a method for controlling the removability of an ignition key in a vehicle that has a transmission with a P operating mode blocking the rotation of an output shaft and an additional transmission disposed between the transmission and the vehicle that can be shifted into an N operating mode in that its output shaft rotates freely when decoupled from the input shaft, in which process the removability of the ignition key is only enabled if the transmission is in the P operating state and the additional transmission is not in the N operating state.

In this way it is ensured that vehicle is parked in the blocked state.

Moreover, a method for the control of the operability of an additional transmission of a vehicle is used for to achieve the object of the invention, the additional transmission being disposed between a transmission, which is shifted into a P operating mode blocking the rotation of an output shaft, and the vehicle wheels and may be shifted into an N operating state, its output shaft rotating freely when decoupled from the input shaft. In this method, the additional transmission may only be shifted into the N state if the transmission is not in its P state. In this way, it is guaranteed that the blocking state of the vehicle may not be released unintentionally.

A further solution of the object of the invention is achieved with a device for controlling the removability of an ignition key in a vehicle that has a transmission with a P operating state, which blocks the rotation of an output shaft, and an additional transmission disposed between the transmission and the vehicle wheels that may be shifted into an N operating state in that its output shaft rotates freely when decoupled from the input shaft, which device has a detection device for detecting the operating state of the transmission, a detection device for detecting the operating state of the additional transmission, a locking device for locking or releasing the removability of an ignition key and a control device connected to the detection devices and a locking device, the control device controlling the locking device in such a manner that the removability of the ignition key is enabled if the automated transmission is in the P operating state and the additional transmission is not in the N operating state.

Furthermore, the object of the invention is resolved with a device for the control of the operability of an additional transmission of a vehicle, the additional transmission being arranged between a transmission, which may be shifted into a P operating state that blocks the rotation of an output shaft, and the vehicle wheels and may be shifted into an N operating state in which its output shaft rotates freely while disengaged from the input shaft. This device contains a detection device for the detection of the operating state of the transmission, a detection device for the detection of the operating state of the additional transmission, a locking device for blocking the shifting of the additional transmission into the N state and a control device connected to the detection devices and the locking device, the control device controlling the locking device in such a manner that the additional transmission may be shifted into its N state only if the transmission is not in its P state.

Additional solutions of the object of the invention are produced with the following methods, any automated shift transmission being usable if no explicit reference to a twin-clutch transmission is made.

A method for the safe parking of a vehicle equipped with an automated shift transmission includes the following steps:
  a) Check whether the vehicle is stopped and the ignition is off; if yes
  b) Check whether a starting gear is engaged; if yes
  c) Check whether clutch is engaged; if yes
  d) Termination of the parking procedure.

A method for the safe parking of a vehicle equipped with an automated shift transmission having a parking lock includes the following steps:
  a) Check whether the ignition is off and parking lock engaged,
  b) Check whether a starting gear is engaged, if yes
  c) Check whether clutch is engaged, if yes
  d) Termination of the parking procedure.

Advantageously, the starting gear engaged in step b) for both the aforementioned methods depends on the gear that is engaged in the preceding operating cycle of the vehicle.

It is also advantageous if the automated shift transmission is an automated twin-clutch transmission having two partial transmissions and clutches assigned thereto, a gear being shifted in step b) in each partial transmission and both clutches being engaged in step c).

An additional advantageous method for parking a vehicle equipped with an automated shift transmission having a parking lock includes the following steps:
  a) Check whether the ignition is off and parking lock engaged,
  b) Check whether all gears are disengaged, if yes
  c) Check whether clutch actuation is concluded, if yes
  d) Termination of the parking procedure.

It is expedient if a check is made in an additional step before step d) of whether a handbrake is operated.

Furthermore, it is advantageous if the removability of an ignition key is only released if all procedural steps are fulfilled.

A method for enabling a starting operation in a vehicle equipped with an automated shift transmission includes the following steps:
  a) Check whether the ignition is on; if yes
  b) Check whether brakes activated; if yes
  c) Check whether clutch is disengaged; if yes
  d) Enable starter operation.

The aforementioned method advantageously includes steps following step d):
  d) Check whether the vehicle moves in conjunction with or after rotation of the engine without a change of the driving program into a gear having been carried out; if yes
  e) Cancellation of the starter enabling and switching off of the engine.

A method for enabling a starting operation in a vehicle equipped with an automated shift transmission with a parking lock includes the following steps:
  a) Check whether ignition is on and parking lock engaged; if yes
  b) Check whether clutch is disengaged; if yes
  c) Check whether there is a desire to start; if yes
  d) Activate starter.

Another method for enabling a starting operation in a vehicle equipped with an automated shift transmission with a parking lock includes the following steps:
  a) Check whether ignition is on and parking lock engaged; if yes
  b) Check whether clutch is disengaged; if yes
  c) Enable starter operation so that the starter can be operated.

Advantageously, the disengagement of both clutches is checked in the step in which the disengagement of the clutch is checked in a twin-clutch transmission.

It is advantageous if a starting gear is engaged no later than during the activation of the starter.

In this context the starting gear advantageously depends on the gear in which the vehicle was running in the preceding operation cycle of the vehicle.

If the automated-shift transmission is a twin-clutch transmission, the first and the second forward gear are advantageously engaged or a forward starting gear and reverse gear are engaged no later than during the activation of the starter.

It is expedient to engage the clutch associated with the selected starting gear and to release the vehicle brakes or parking lock when shifting the control unit into a gear.

Furthermore, it is advantageous if, when the vehicle is stopped and there is change of the setting of a control unit of the transmission, a corresponding change of the transmission state only occurs if the setting of the control unit is kept during a predetermined time period.

A device for carrying out a predetermined method includes:
  a control unit for setting an operating state desire for an automated-shift transmission,
  an actuation unit for shifting gears of an automated-shift transmission,
  an actuation unit for at least one clutch disposed between a motor and the automated-shift transmission,
  an ignition switch,
  a starter switch,
  a starter for the engine,
  a device for keeping the vehicle at a standstill, and
  an electronic control device, which is connected to the aforementioned assembly groups and whose operation exercises control during the procedural step.

The device for holding the vehicle at a standstill is advantageously at least one of the following devices:
  mechanical parking locks, for example, by Bowden cable between control unit 46 and transmission 40 or at least releasable by an actuator via a control device,
  by a control device operable via
  a braking system of at least one actuator.

BRIEF DESCRIPTION OF THE DRAWINGS

The invention is explained below in reference to schematic drawings by way of example and with additional details. In the drawing:

FIG. 5 is an illustration of the shifting scheme of an automated-shift transmission that was expanded with a parking lock release position;

FIG. 6 is an illustration similar to that of FIG. 5 that shows a shifting scheme for a parallel shift transmission; and FIG. 7 is a schematic illustration of an emergency unlocking device for a parking lock.

DETAILED DESCRIPTION OF THE INVENTION

Figure 1:
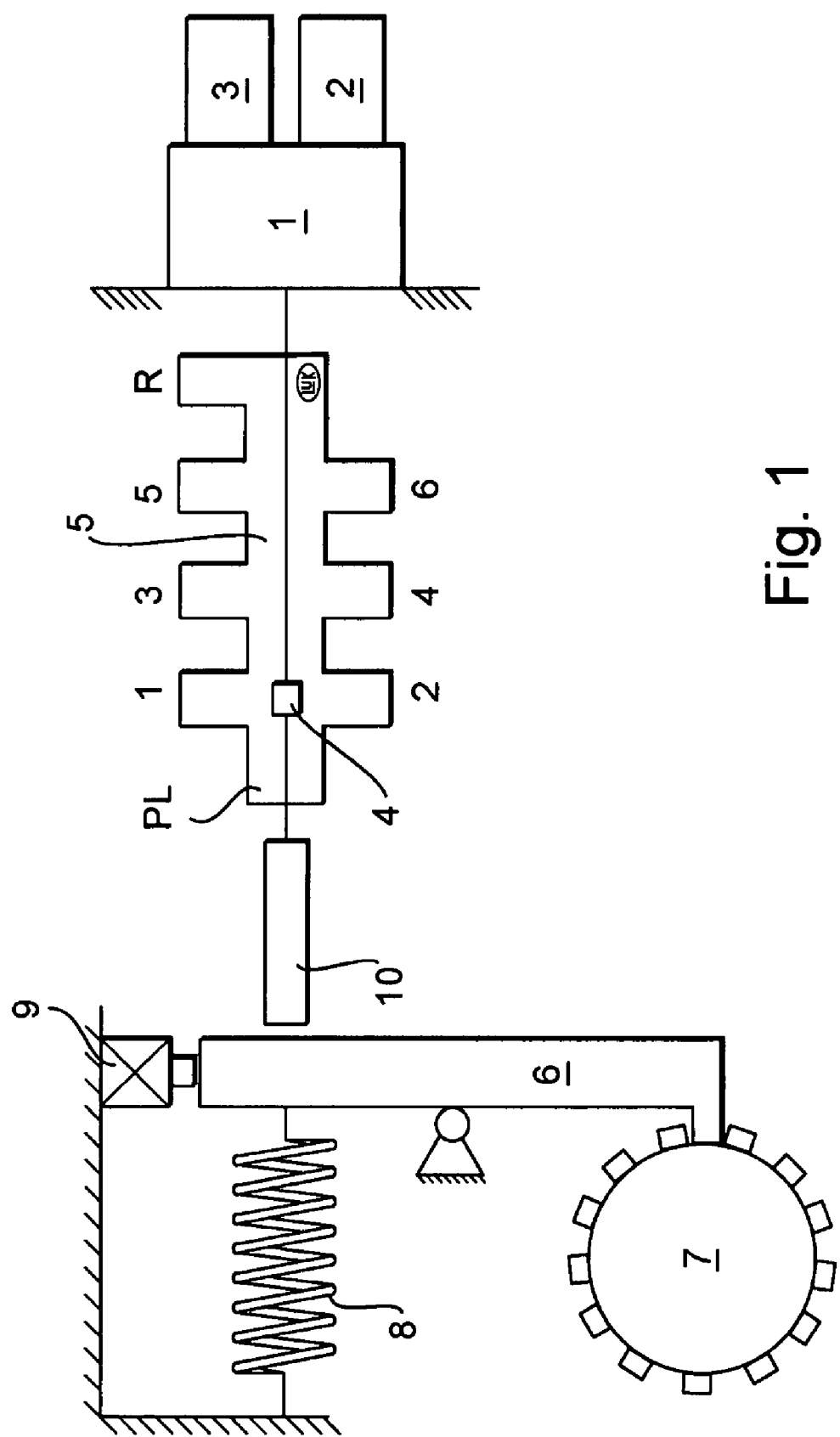
FIG. 1 is a schematic illustration for the explanation of the device for actuating a parking lock that is located in the locked state.

FIG. 1 of the drawing shows a device for the actuation of a parking lock of an automatically actuated shift transmission.

Actuator 1 has two electric motors 2, 3 in the illustrated embodiment, motor 2 being provided for the execution of the selection operation, i.e., is responsible for the displacement movement of shift finger 4 between the individual shift gates in which the individual gear ratios 1 to 6 and the reverse gear are located. Second electric motor 3 is used for the movement of the shift finger 4 within the individual shift gates, that is, for example the shift gate with gears 1, 2 and therefore for the execution of the shift operations or the engagement and disengagement of the gears.

The shift scheme having six forward drive gears and one reverse gear has been expanded by one actuation position "Parking lock release", designated with the label PL, in which shift finger 4 may be driven by electric motor 2 in order to be able to release a locked parking lock, that is, to be able to release a schematically illustrated parking pawl 6 from engagement with a schematically illustrated parking lock gear 7.

As is evident based solely on FIG. 1 of the drawing, a parking lock is illustrated in the locked position.

In the illustrated embodiment, the activation of the parking lock, that is, the engagement of parking pawl 6 in parking lock gear 7, which is connected to the output shaft of an automated-shift transmission (not shown in detail), is brought about by a mechanical spring device 8 impinging parking pawl 6 in such a manner that parking pawl 6 engages in parking lock gear 7 if parking pawl 6 is not kept open.

Figure 2:
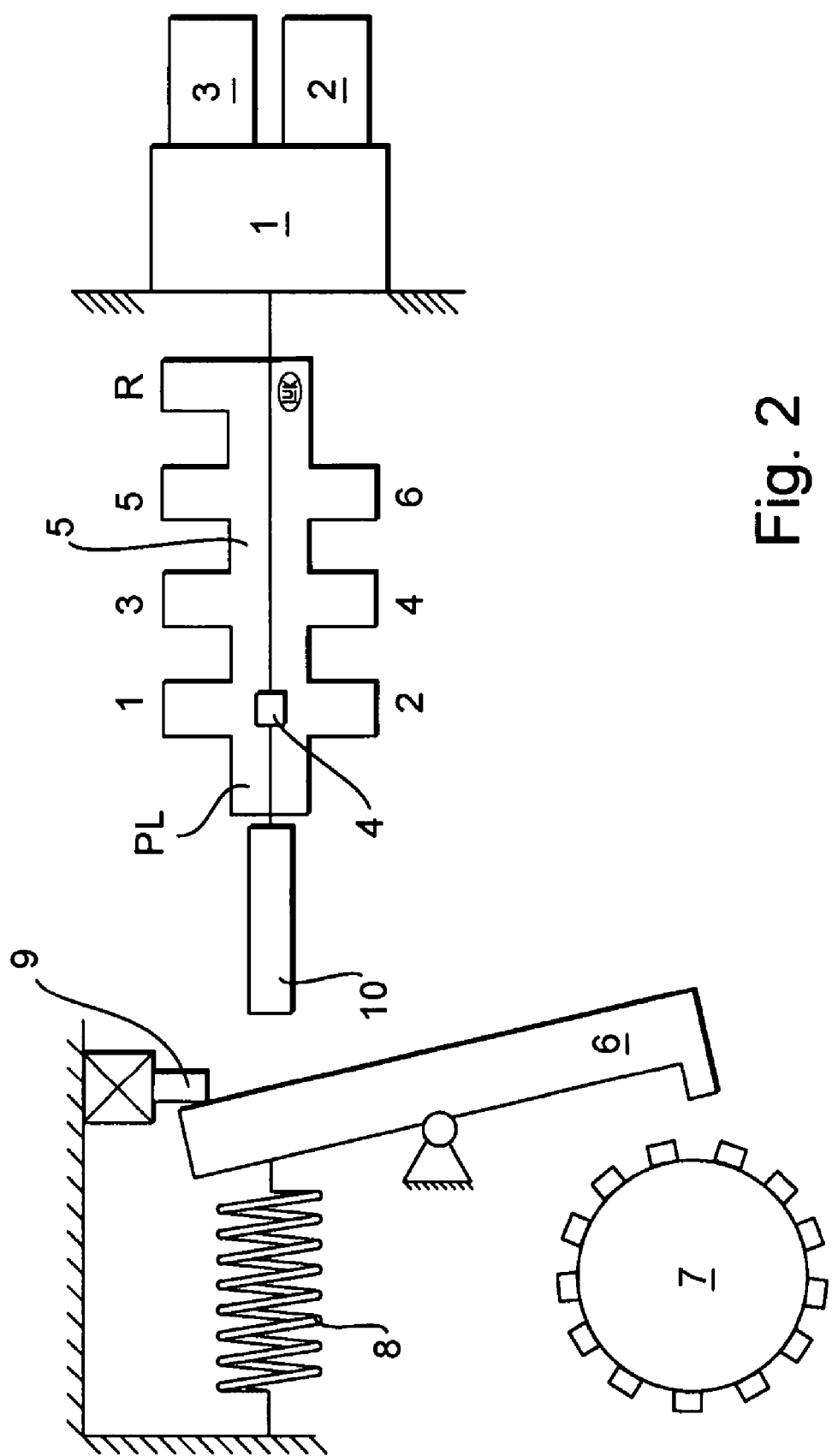
FIG. 2 is an illustration similar to that of FIG. 1 that shows the unlocked state.

Moreover, FIG. 1 of the drawing shows a holding actuator 9 that is used to keep parking pawl 6 out of engagement with parking lock gear 7. In this regard, refer to FIG. 2 of the drawing. It shows a state in which parking pawl 6 is found disposed in a state in which it is not situated with the parking lock gear engaged. In this state, holding actuator 9 holds parking pawl 6 and therefore acts against the spring force of the mechanical spring device 8. Holding actuator 9 may be an electromagnet, for example, that holds parking pawl 6 open when a low holding current is applied. If the parking lock is to be activated and for this purpose the application of current to the holding actuator 9 is interrupted, mechanical spring device 8 presses parking pawl 6 into an engagement with parking lock gear 7 and in this way activates the parking lock of the automated-shift transmission.

An application of current to selector motor 2 causes a movement of shift finger 4 in the direction of actuation position "PL" in which it presses schematically illustrated component 10 against the action of the mechanical spring device in such a manner that parking pawl 6 is released from the engagement with parking lock wheel 7. Thereafter, current is applied to holding actuator 9 in order to keep the parking lock in the open state according to FIG. 2 of the drawing.

The activation of the parking lock from the deactivated state into the activated state according to FIG. 1 may therefore be brought about by the application of current to holding actuator 9 being interrupted and therefore mechanical spring device 8 presses parking pawl into an engagement with parking lock gear 7. The interruption of the application of current to holding actuator 9 in this context may be triggered by the driver of the vehicle, wherein he operates a selector device via which the parking lock may be activated in the described manner. The selector device in this context may be the selection lever in the vehicle interior with which the driver also operates the transmission, that is, he may select an automatically running driving program. However, the invention is not restricted to this; rather, the driver may also bring about the activation of the parking lock by operating a shifter that is functionally separate from the selector device. The parking lock in this context is activated if the vehicle is stationary or henceforth moving at a low speed of, for example, 2 km/h. However, in addition to this activation of the parking lock intentionally produced by the driver, it is also possible to activate the parking lock automatically.

Such an automatic activation may occur, for example, if a control pulse required for the operation of the vehicle is not detected, that is, for example, the ignition key for the operation of the vehicle was removed or another access control device, such as a key card or the like, was removed and the driver of the vehicle has forgotten, for example, to activate the parking lock.

In addition, it is also possible to activate the parking lock if it is determined that the driver of the vehicle has left the vehicle and the selector device with which transmission positions may be selected is located in a drive position. If the driver, for example, has moved the selector device into a position "D" for an automatically running shift program, brought the vehicle to a stop with the service brake and then left the vehicle, it is provided according to the invention to activate the parking lock so that an unintentional rollaway of the vehicle is prevented.

In addition to this, it is also provided that the parking lock is activated after the determination of an error situation, that is, an emergency situation is detected.

Such a fault situation may, for example, comprise determining that the engine of the vehicle was stopped, but the selection lever was not pushed into a position corresponding to the activation of the parking lock, but is still located in a position that corresponds to a driving program. It is also provided that the parking lock is activated if a fault condition of the selector device is detected in a drive position and the vehicle is operating at a low speed of, for example 2 km/h. In addition to this automatic activation of the parking lock with a selector device located in a drive position, such activation may also be provided if the selection lever is located in a position corresponding to the neutral position of the transmission.

According to the invention, it is very generally provided that the parking lock is activated if it is determined that the energy for activation of the transmission has failed, that is, a disabling breakdown of the vehicle has occurred, after which an uncontrolled rollaway of the vehicle is to be prevented.

An activated parking lock is deactivated according to the invention if the service brake of the vehicle is operated and a drive position or a neutral position of the transmission is selected via the selector device. Such a deactivation is possible, if the vehicle has an internal combustion engine as the drive motor when the internal combustion engine is running or stationary. The activated parking lock in this context may be deactivated via the actuator, that is electric motor 2 already described above for the displacement movement of shift finger 4 inside the shift gate in the operating position "PL" and may be held in a deactivated position via a holding actuator in the form of, for example, electromagnetic holding actuator 9. The deactivation of the parking lock may also be realized by electric motor 3, for example, as a function of the force that is required for the deactivation if this motor 3 is designed to have greater power than motor 2. A combination of both motors for operation of the parking lock is also possible. The trigger operation for the deactivation of the parking lock may be a displacement movement of the selector device if it is determined, for example, that the selector device for the transmission positions is pulled out of a position corresponding to the parking lock position by the driver.

Figure 3:
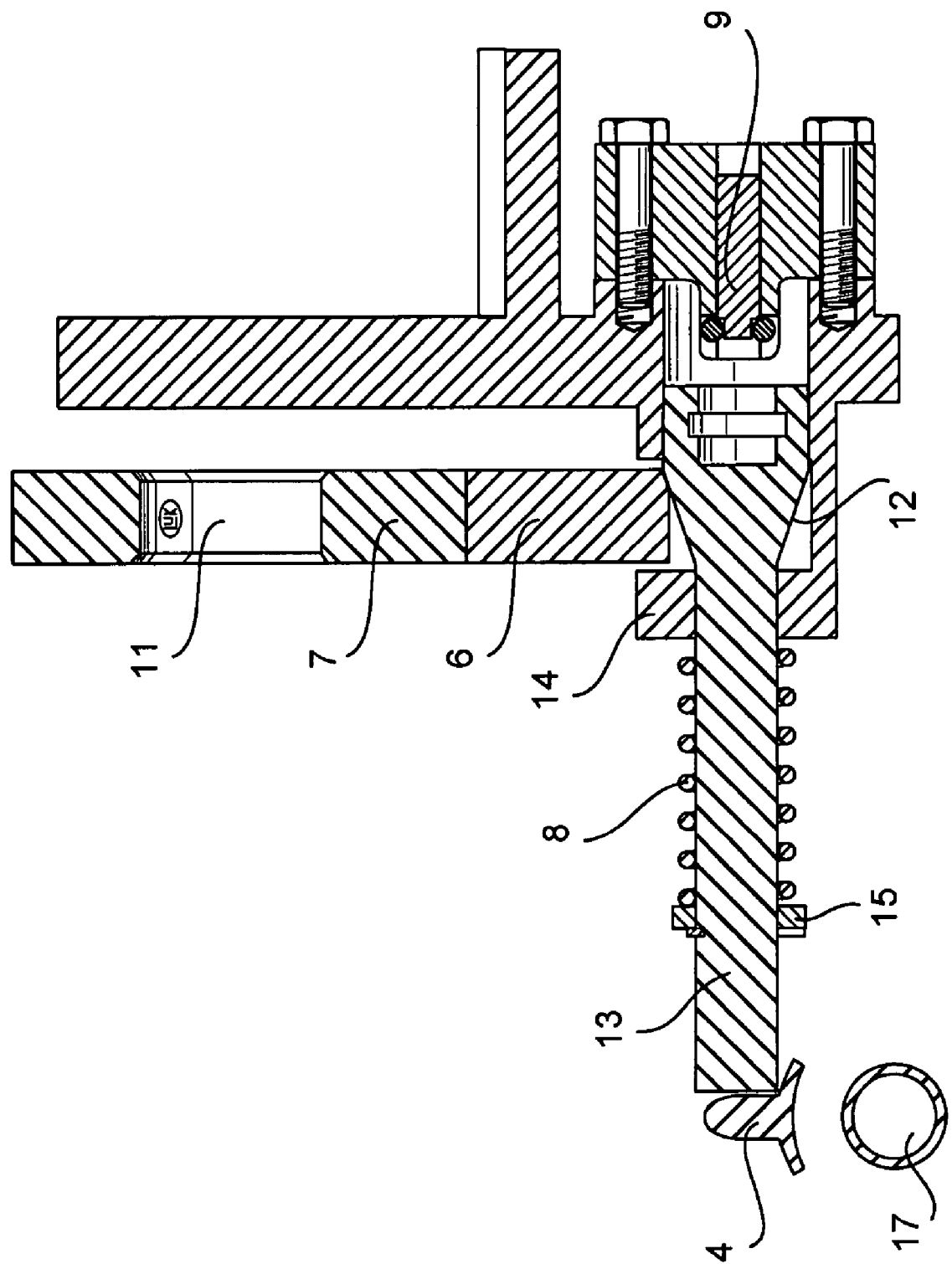
FIG. 3 is a partial cutaway illustration of a parking lock device in the locked or blocked state.

FIG. 3 of the drawing shows an embodiment of a parking lock with actuating device in a locked state. A parking pawl 6 is in an engaged state with a parking lock gear 7 so that parking lock gear 7 prevents a rotation of the transmission shaft via its rotationally fixed connection to a transmission shaft that is not shown in detail here, but whose rotational axis is designated as reference character 11.

Figure 4:
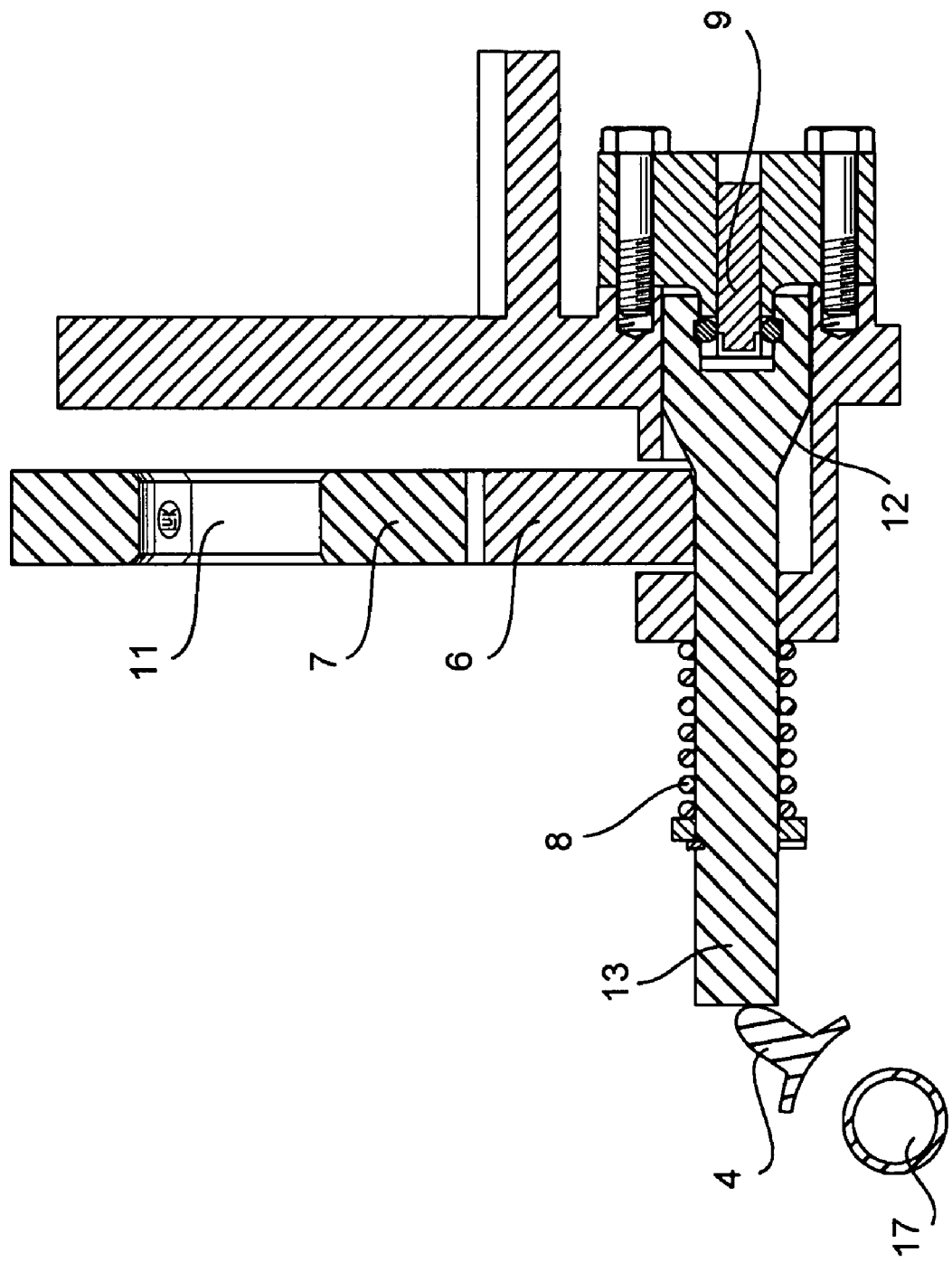
FIG. 4 is an illustration similar to that of FIG. 3 in the unlocked or open state.

In this context, parking pawl 6 is pressed via conically inclined profile 12 of an actuation bolt 13 into engagement with parking lock gear 7 and specifically because of the spring force of spring 8, which braces against a collar 14 and a thrust ring 15 so that spring 8 always then presses parking pawl 6 into the engaged state with parking lock gear 7 if current is applied to holding actuator 9, which is designed as an electromagnet, and actuation bolt 13 is located in the withdrawn position illustrated in FIG. 4, and shift finger 4 is not located in a turned position as illustrated in FIG. 4 by which actuation bolt 13 is pressed into the disengaged position against the force of spring 8. In this context, shift finger 4 is moved by the rotational movement of shaft 17 of electric motor 3.

FIG. 4 of the drawing then shows the unlocked or open state of the parking lock, which is distinguished by parking pawl 6 having been released from engagement with parking lock gear 7 and specifically by shift finger 4 having been rotated by the rotary movement of shaft 17 depicted in FIG. 4 and, thus, actuation bolt 13 having pressed against the compressive force of spring 8 in the rightward direction in the drawing so that parking pawl 6 has carried out a downward directed relative movement on the diagonally running profile 12 of actuation bolt 13 and therefore has been released from engagement with the parking lock gear. In the open state of the parking lock illustrated in FIG. 4, it is possible to apply current to holding actuator 9, which holds actuation bolt 13 in the illustrated disengaged position so that shift finger 4 may be turned back out of the adjacent position against actuation bolt 13 in order to be run in the select gate and the shift gates of the shifting scheme.

A shifting scheme of an automated-shift transmission that expanded by a parking lock release position PL is illustrated in FIG. 5 of the drawing. The illustrated shifting scheme is a shifting scheme associated with an automated-shift transmission having six forward gears and one reverse gear. As is evident without further elaboration, selection gate WG has been expanded by the parking lock release position PL so that a shift finger moving within shift gate WG may be moved into parking lock release position PL and in particular via the selection actuator or electric motor 2 for the selection operation.

FIG. 6 of the drawing shows a similar shifting scheme of a parallel shift transmission having six forward gears and a reverse gear in which shift gate WG was expanded by parking lock position PL. A movement of the shift finger by the select actuator into parking lock position PL in selection gate WG leads in both cases to a release of the parking pawl from the engagement with the parking lock gear. In this released position, the parking pawl is then held by the holding actuator, which may be provided twofold for reasons of redundancy and safety in order to prevent an undesired locking of the parking lock. In such an embodiment, it is also advantageous if one of the holding actuators is driven by the transmission control and the other holding actuator by the motor control system so that, in the event of a failure of one of the two control systems, an undesired locking of the parking lock may still be prevented.

FIG. 7 of the drawing shows a schematic illustration of an emergency unlocking device by means of which the activated parking lock can be deactivated. Selection lever 18 is designated with reference character 18 with which the driver can bring about individual transmission positions or can also select an automatically running shift program. A mechanical force transmission device in the form of, for example, a cable pull 19, is connected to selection lever 18. Cable pull 19 acts on a lever 20, which is illustrated in three positions and specifically in two dashed-line positions that correspond to a locked parking lock position and a position represented with solid lines that correspond to an unlocked position of the parking lock. By a pulling movement on selection lever 18 into the disengaged position represented on the right in dashed lines, lever 20 may be pulled from both locked positions into the unlocked position and in this way the parking lock may be unlocked. With this emergency unlocking device, when the vehicle is disabled by a breakdown, for example, a failure of the transmission control for driving the selection actuator, it is possible to shift the parking lock into the unlocked position. The dashed-line position of selection lever 18 corresponds in this context to a position corresponding to an emergency unlocking position in the shift gate in the vehicle. In order to be able to avoid an unintentional actuation of the selection lever 18, it is possible, for example, that this position of the selection lever 18 may only be brought about against the compressive force of a spring or the like so that it is verified for the driver of the vehicle that he is executing an emergency unlocking operation of this type. In a similar way it is also possible that the selection lever must be pressed against the force of a spring to shift the parking lock into the desired position P. In this way, the command is recognized that the parking lock is to be engaged and the parking lock is activated by, for example, an actuator or also the aforementioned already described spring device. After the detection of the command for the activation of the parking lock and the verification of this command, the remaining path of the selection lever to the limit position is then released in which the selection lever can then be locked so that it may only be removed from this position when a condition is present, such as an actuated service brake of the vehicle. The aforementioned verification before enabling shifting the selection lever to position P may also include additional signals, e.g. the release of the service brake. An additional possibility of the verification is that the ignition key of the vehicle may only be removed if the driver has moved the shift lever into position P and in this way the parking lock has been engaged.

Figure 8:
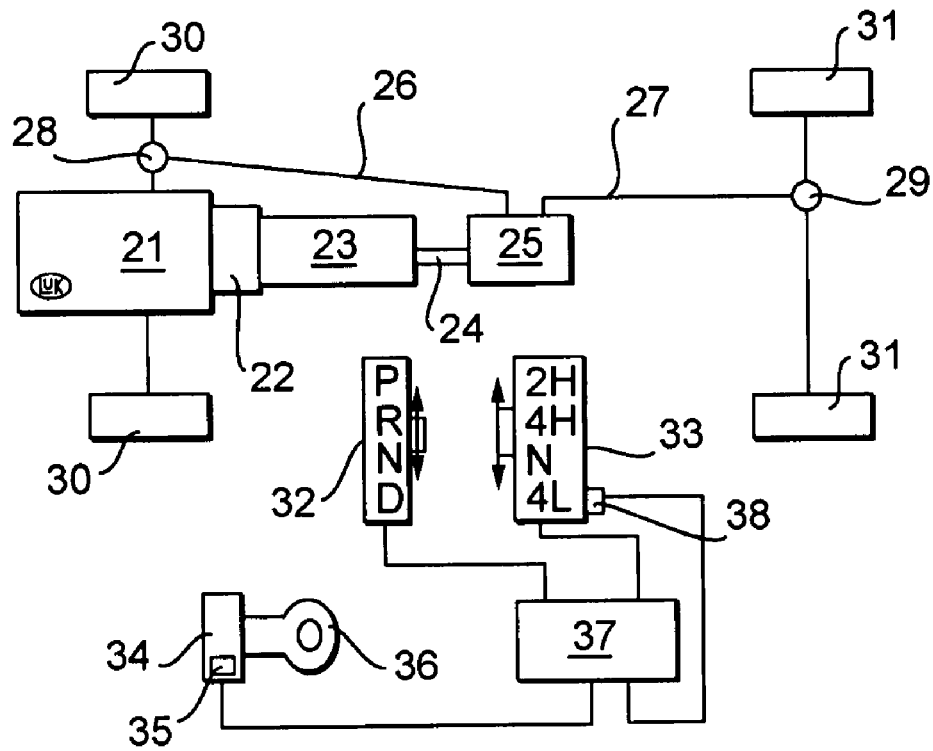
FIG. 8 schematically shows a vehicle with a drivetrain and an accompanying operation and control unit.

According to FIG. 8, a vehicle has an engine 21 that is connected via a controllable torque transmission device, for example, a clutch 22 to a transmission 23 whose output shaft 24 is connected to the input shaft (not shown) of an additional transmission 25, which is connected via drive shaft 26 and 27 to differentials 18 and 20 via which front wheels 22 or rear wheels 24 are driven.

Transmission 23 is, for example, a conventional automatic transmission with planetary sets. Clutch 22 is a torque converter with a lock-up function. Additional transmission 25 is a so-called "transfer chase" with which transmission output shaft 24 or the input shaft (not shown) of additional transmission 25 may be connected in different ways to drive shafts 26 and 27.

Transmission 23 is operated via control unit 32 that has a P position (output shaft 24 locked), an R position (reverse gear), an N position (neutral) and a D position in which different forward gears are shifted depending on the operating state of the vehicle and the operation of the gas pedal. Clutch 22 and transmission 23 are controlled according to the position of manually actuated control unit 32 by actuators in an electrical, electro-hydraulic or other known manner.

A control unit 33 with which various operating states may be shifted is a part of additional transmission 25; these states include:

2H: two-wheel drive (front-wheel or rear-wheel), ratio high (normal state),

4H: four-wheel drive, ratio H

N: neutral (no connection between input shaft of the additional transmission and output shafts 26 and 27) or 4L: four-wheel drive with additional gear ratio for rough terrain.

The control unit 33 can cooperate directly with additional transmission 25 or control it via a control device and actuators.

The structure and function of the described functional units are known and therefore are not described in further detail here.

It is also known to provide an ignition lock 34 having a locking device 35 and with which the removability of an ignition key 36 from ignition lock 34 can be blocked if the control unit 32 or its selection lever is in the P position. For this purpose, control unit 32 is connected to a control device 37 that actuates control unit 32 in the P position in such a manner that ignition key 36 is not removable from ignition lock 34. Locking device 35 may, for example include an electromagnet.

The logic of the locking of the removability of ignition key 36 is that the ignition key may only be removed if transmission 23 and—when there is no additional transmission 25—so that the vehicle is blocked. In this way it is guaranteed that the vehicle left in the park position after removal of the ignition key, that is in the blocked condition, is parked.

Due to the presence of the additional transmission 25, which may be shifted into a neutral position, the effect of the parking lock is no longer guaranteed, because with transmission 23 located in P, no vehicle blocking is ensured because additional transmission 25 can be in its neutral position.

According to the invention, control device 37 is therefore also connected with control unit 33 of additional transmission 25 and only releases locking device 35 if control unit 32 is shifted into P for transmission 23 and control unit 33 is not shifted into N for additional transmission 25. In this way it is ensured that ignition key 36 is only removed if the parking lock of transmission 23 actually blocks the vehicle.

In order to prevent a shifting of additional transmission 25 into its neutral position if transmission 23 is located in the P position, whereupon the parking lock effect would be cancelled, a locking device 38 that prevents shifting of control unit 33 into N if transmission 23 is located in the park position is provided on control unit 33. As illustrated, this blocking may be achieved by mechanical blocking of the selection lever of control unit 33 or by virtue of a control unit provided for additional transmission 25 not executing a shift command coming from control unit 33 if transmission 23 is in park position. Control device 37 then includes a corresponding logic with which the control unit (not shown) for additional transmission 25 is driven. Altogether, additional transmission 25 may therefore only be shifted into N if the parking lock is not engaged, that is, transmission 23 is not in the P position.

Of course, the previously described logic of the removability of ignition key 36 may be applied individually or in combination only if transmission 23 is in the P position and additional transmission 25 is not in the N position at the same time and the logic of blocking of the shiftability of additional transmission 25 into the N position may be applied only if transmission 23 is in the P position. Transmission 23 does not necessarily have to be an automatic transmission; it may also be a manual shift transmission with an additional blocking position or with a logic of such a type that the engaged gear or a first forward gear is counted by control device 36 as a P position.

The particular position or the particular state of the transmission and the additional transmission do not have to be detected on the associated control units, but instead may also be detected by sensors integrated in the transmission.

Figure 9:
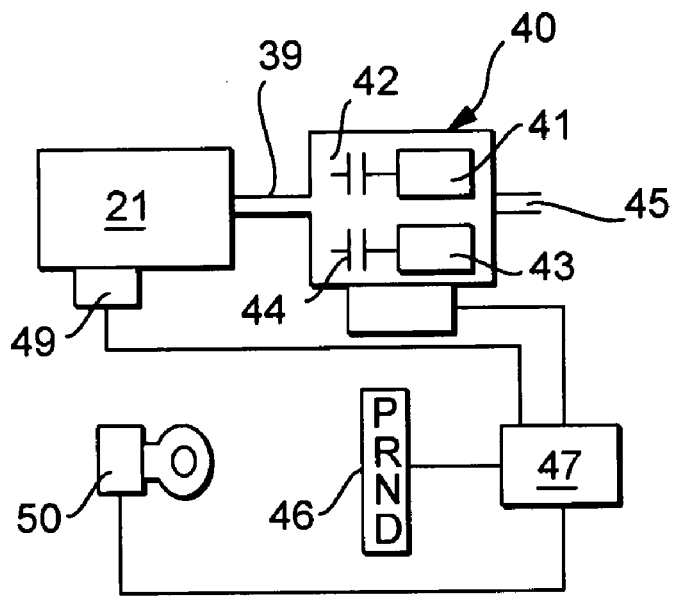
FIG. 9 shows a twin clutch transmission connected with a vehicle engine along with accompanying control units.

FIG. 9 schematically illustrates an engine 21 whose output shaft forms input shaft 39 of a twin-clutch transmission 40. Such a twin-clutch transmission 40 is known in terms of its structure and includes a first partial transmission 41 with a clutch 42 assigned thereto and a second partial transmission 43 with a clutch 44 assigned thereto. In this way, two parallel transmission paths 42, 41 or 44, 43, via which the rotation of input shaft 39 may alternately be transmitted to an output shaft, are formed in twin-clutch transmission 40. Because of the parallel transmission paths, twin-clutch transmissions are also called parallel-shift transmissions.

The control of the twin-clutch transmission occurs via a control unit 46 with positions P, N, R, D and an electronic control device 47, which is connected to sensors (not shown individually) and drives a control unit 48 of twin-clutch transmission 40 that is provided with actuators. The control device provided with a microprocessor and associated memories, etc., may be configured in a different way and does not have to be a central unit, but as a control device may be divided into a plurality of decentralized units. Reference character 49 designates a starter of motor 21; reference character 50 designates an ignition lock.

Figure 10:
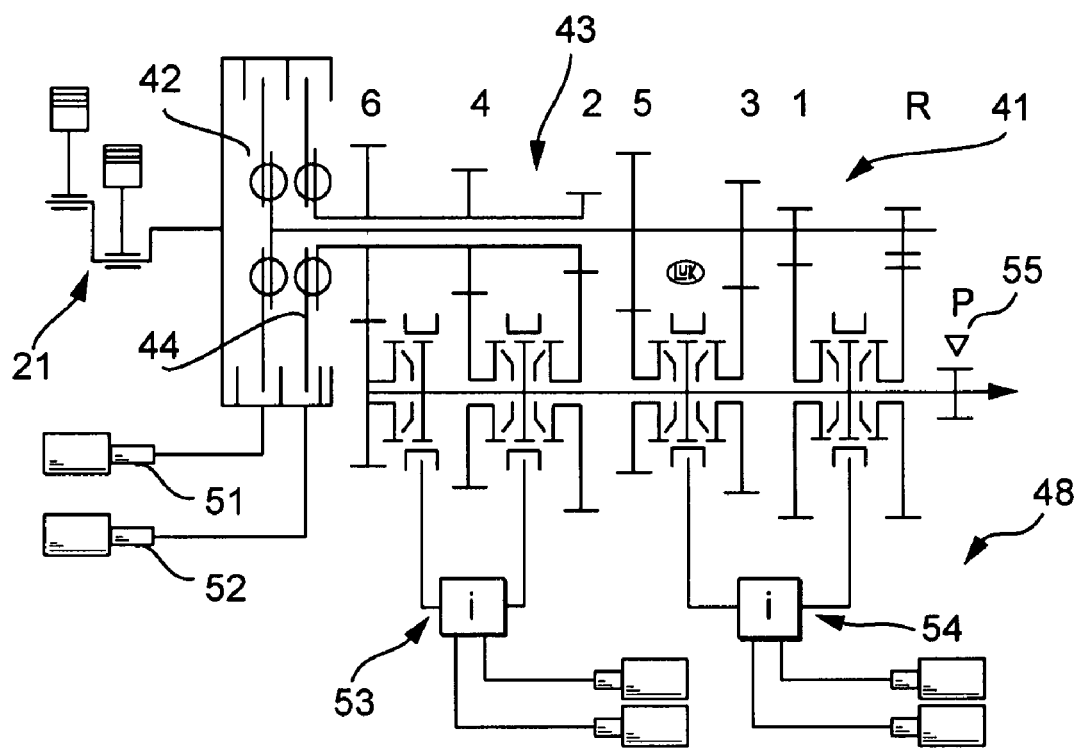
FIG. 10 shows a scheme of a twin clutch transmission with parking lock, two clutch actuators and two transmission actuators.

FIG. 10 shows the structure of a twin-clutch transmission somewhat more precisely. Actuation unit 48 controls two clutch actuators 51, 52 and two transmission actuators 53, 54 and a parking lock 72 that is driven by control device 47 like the actuators. Structure and function of such a twin-clutch transmission are known, so they are not explained further. The individual numbers at the top in the Figure indicate the gears.

Figure 11:
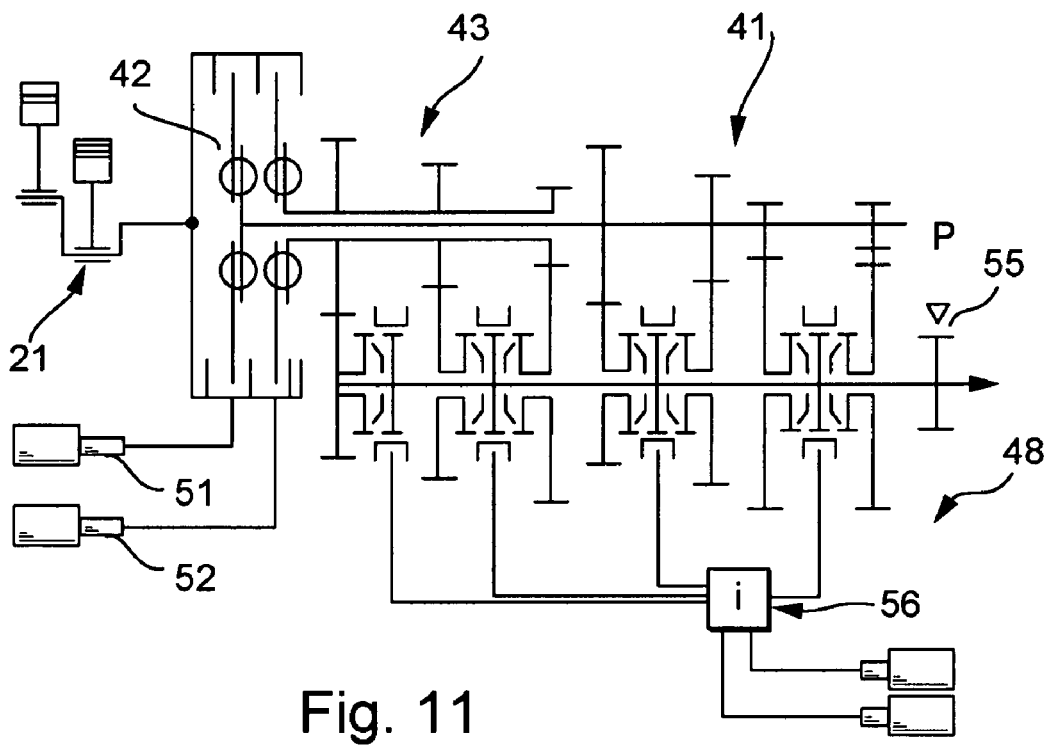
FIG. 11 shows a scheme of a twin clutch transmission with parking lock and reduced transmission actuators.

FIG. 11 schematically shows the structure of a twin-clutch transmission whose actuation unit 48 also contains two clutch actuators 51, 52, but only one transmission actuator 56 that shifts both partial transmissions 41 and 43. In this context, for each gear of the one partial transmission, each gear of the other partial transmission may be engaged, but always only one gear in each of the two partial transmissions. Structure and function of such a twin-clutch transmission are likewise known, so they explained no further.

Figure 12:
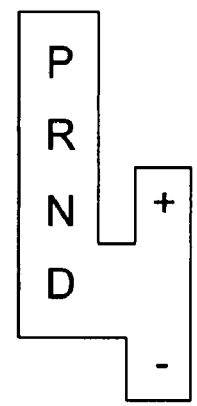
FIG. 12 shows a layout of the mobility of a shift lever.

FIG. 12 shows an example of a layout of control unit 43 with a selection lever gate in which the selection lever may be moved into positions P, R, N and D. The selection lever may be laterally moved from D into a further gate in which when the selection lever is moved upward when there is a shift to a higher forward gear and downward when there is a shift into a lower forward gear.

In general, the first and second gears are considered as forward drive gears, the first gear being used for strained driving and crawling at low speed and the second gear being used for normal driving.

In the conventional automatic transmission (that works, for example, with planetary sets and a converter clutch), a high operational reliability is achieved by the ignition key only being removable if the transmission is located in the P position, i.e., the vehicle is blocked. Furthermore, the engine may only be started in the P position or N position. To set off, the brake pedal must be operated when a drive gear is engaged, a driving torque then being transmitted with which it is possible to set off without any time delay.

Methods or strategies are depicted below with which a similar reliability and a similar comfort may be achieved in a twin-clutch or parallel-shift transmission. These strategies may also be used, if the two clutches or the simultaneous shiftability of two gears are not essential, in automated shift transmissions having only one clutch.

Figure 13:
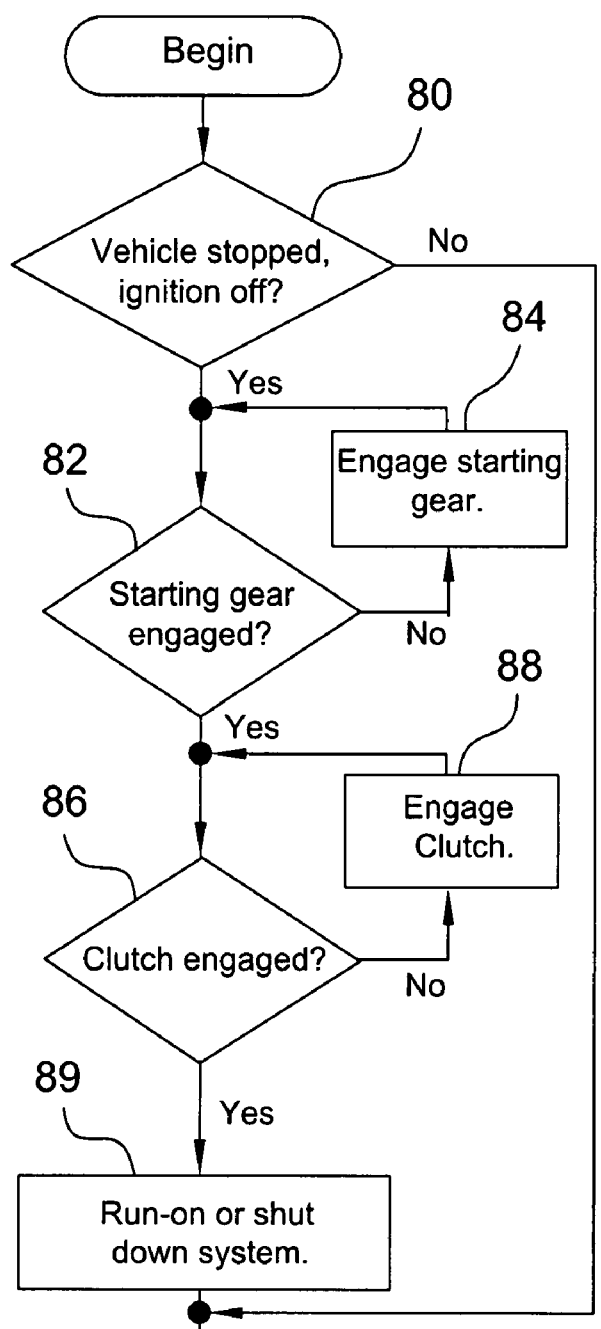
FIG. 13 shows a flow diagram for parking in a twin-clutch transmission without parking lock.
Figure 14:
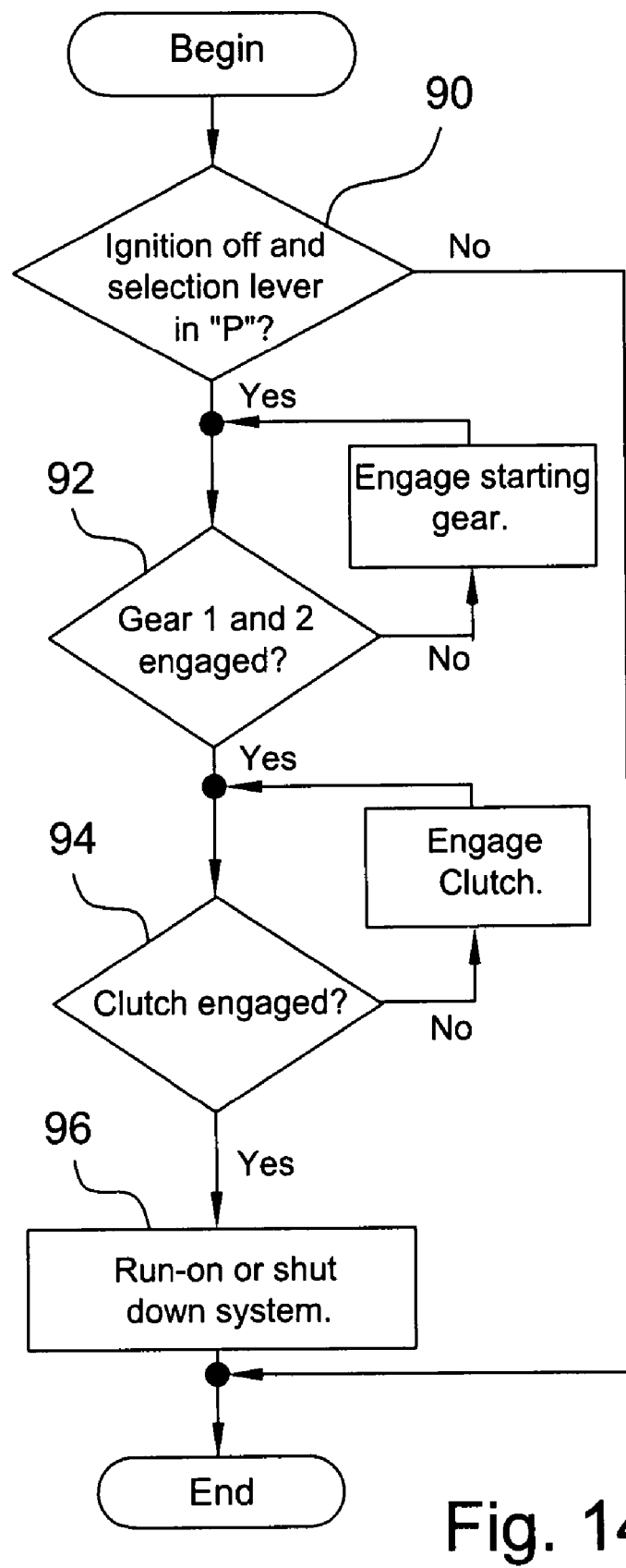
FIG. 14 shows a flow diagram for parking in a twin-clutch transmission with parking lock.

Next, a reliable stopping or parking of a vehicle with an automated-shift transmission that has no separate parking lock is explained in relation to FIG. 13.

In step 80 a check is made of whether the vehicle is at a standstill and the ignition is off. If this is not the case, then the parking cycle is discontinued. If this is the case, then in step 82 a check is made of whether a starting gear is engaged. If this is not the case, the system in step 84 engages a starting gear and reverts back to step 82. If a starting gear is engaged, then a check is made in step 86 of whether the clutch is engaged. If this is not the case, then the clutch is engaged in step 88. If the clutch is engaged, in step 89 the system sequence is switched off after shutting off the ignition or the system. The vehicle is stopped with an engaged short ratio and, presuming it is not too steep, cannot roll away. Regarding the risk that the vehicle rolls in certain situations in which the braking torque of the stopped engine is not sufficient to hold it, the aforementioned method may be supplemented by additional steps that are explained below.

If the automated-shift transmission is equipped with a parking lock, the parking method may occur in a completely similar manner, a check being made in step 80 of whether the ignition is off and the selection lever is located in P, that is, the parking lock is engaged.

Advantageously, the starting gear with which a parking of the vehicle is engaged depends on the gear previously used in driving. If, for example, reverse gear was last used for parking, it is advantageous to immediately engage a forward gear with which it is then possible to start off immediately. If a forward gear was last used, it is expedient to engage the reverse gear.

An especially reliable stopping method in a parallel-shift transmission with parking lock is explained in relation to FIG. 7.

In step 90 a check is made of whether the ignition is off and the selection lever is located in P. If this is not the case, the stopping cycle is terminated. If this is the case, then a check is made in step 92 of whether a gear is engaged in each of the partial transmissions, for example, gears 1 and 2. If this is not the case, the gears are engaged. If this is the case, a check is made in step 94 of whether the clutches are engaged. If this is not the case, the clutches are then engaged. With the clutches engaged, the system goes on to step 96 in which the sequence or the system is switched off.

The depicted cycle has the advantages that there is a doubled lock, on the one hand, via the parking lock and, on the other hand, via the transmission that blocks with simultaneously active gears as long as the torque transmitted by the engaged clutches is not exceeded.

Of course, the depicted method may be changed to the effect that, in transmissions without a parking lock, a check is just made in step 90 of whether the ignition is off and the vehicle is at a standstill.

In an alternative method for the parking of a vehicle equipped with an automated shift transmission with a parking lock, a check is made in a first step of whether the ignition is off and the parking lock is engaged. In an additional step, a check is then made of whether the transmission is in the zero gear (all gears are disengaged); next a check is made of whether the clutch actuation(s) is (are) terminated, whereby it makes no difference of whether the clutch(es) is (are) engaged or disengaged. If this is the case, the stopping operation is terminated. With the aforementioned method, the vehicle is blocked via the parking lock. For the engagement of a drive gear, there is time available for a later start. The step of checking the termination of the clutch actuation has, for example, the purpose of ensuring that corresponding actuators are force-free. The step of checking the clutch actuation termination is not mandatory.

The aforementioned method, in particular the method according to FIG. 13, may be supplemented to the effect that a check is made in an additional step of whether a hand brake is operated. It is especially advantageous if the hand brake is operable electrically or by another actuator, because it may then be operated by the system.

It is also advantageous to supplement the aforementioned method to the effect that an ignition key may only be withdrawn if all procedural steps for stopping the vehicle have been successfully carried out.

In reference to FIG. 15, a method for a reliable starting of a vehicle equipped with an automated-shift transmission without a parking lock is explained below.

In step 100 a check is made of whether a desire to start is present, for example, a starter switch (e.g., turning of the ignition key) is operated. If this is the case, a check is made in step 102 of whether the brake pedal is actuated. If this is the case, a check is made in step 104 of whether the clutch or in twin-clutch transmissions the clutches are disengaged. If this is not the case, in step 106 the clutches are disengaged and the system reverts back to step 100. If the clutch or clutches is/are disengaged, the starter operation is enabled, i.e., the engine is started in step 108. In this way it is ensured that the vehicle is not set in motion unintentionally. Advantageously, the method is continued in which a check is made in step 110 of whether the vehicle is moving during the start. If this is the case, the engine is actively stopped in step 112, for example, the ignition or the supply of fuel is interrupted.

In a simplified embodiment of the method, a check is made in step 100 just of whether the ignition is switched on and the engine is not running. After step 108 in which the starter operation is enabled by the control device, the starter may then be placed in operation by manual operation of the corresponding switch for starting the engine.

In step 110 it is also possible to check whether no switching of the driving program into a gear was carried out, for example, by operating the selector lever of the control unit. If it is determined that the vehicle is unintentionally set in motion, the starter enabling is advantageously cancelled in step 112 by the transmission control device, and a command to shut down the engine is given to the engine control device.

A method for starter enabling in twin-clutch transmission with a parking lock is explained below in reference to FIG. 16.

In a step 120, a check is made of whether the ignition is switched on and the selection lever is located in P. If this is the case, a check must be made in step 122 of whether the clutches are disengaged and the system reverts back to step 122. If the clutches are disengaged, a check is made in step 126 of whether a starting desire is present, i.e., a starter switch is operated. If this is not the case, the system reverts back to step 122. If a starting desire is present, then the enabling of the starter operation occurs, i.e., the engine is started.

Figure 15:
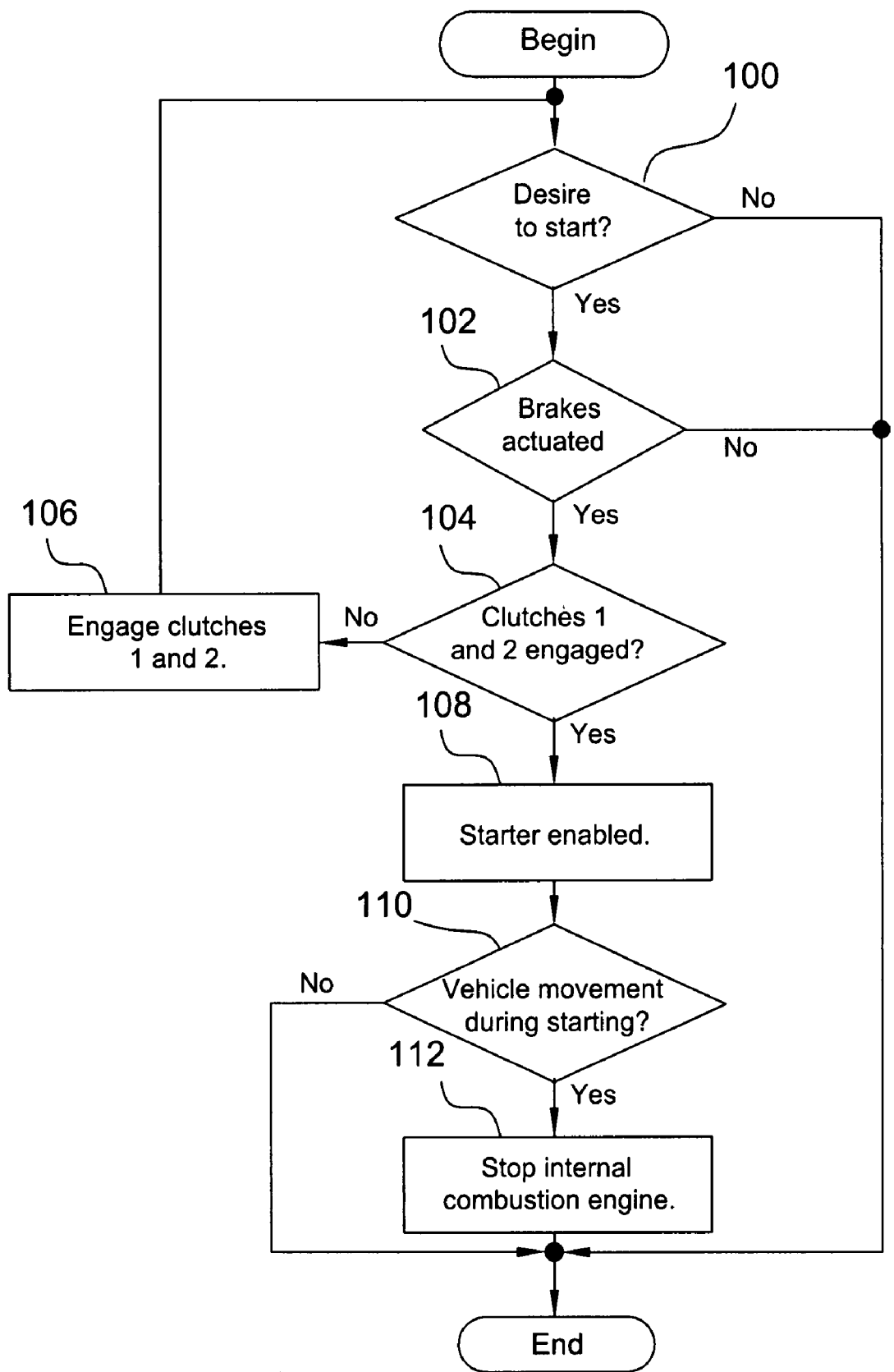
FIG. 15 shows a flow diagram rollaway locking mechanism and starter enable for a twin-clutch transmission without a parking lock and with reduced transmission actuating mechanisms, and, FIG. 16 shows a flow diagram of a starter enable for a twin-clutch transmission with parking lock.
Figure 16:
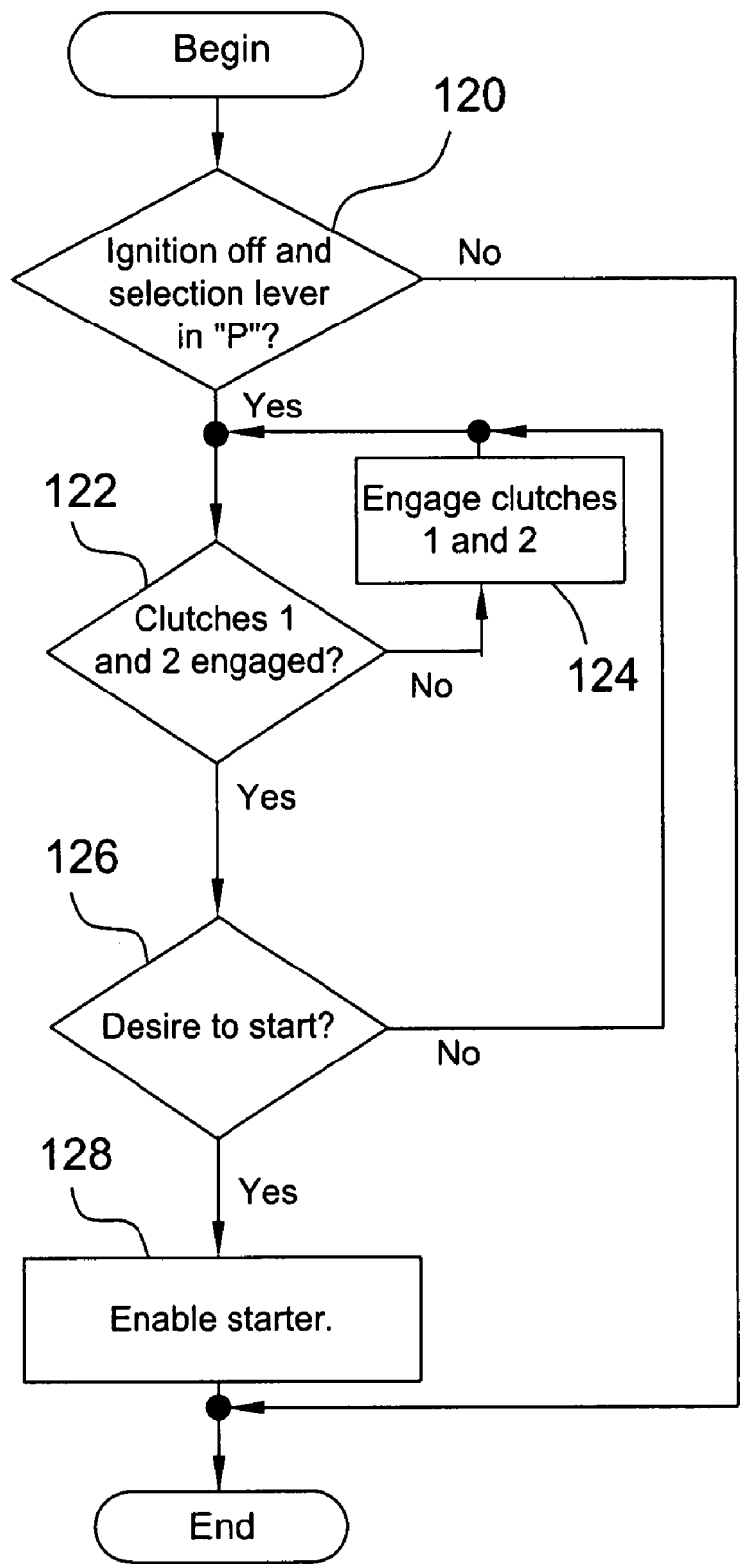

Of course, the method according to FIG. 16 may be supplemented by steps 110 and 112 of FIG. 15.

Furthermore, the method of FIG. 16 may be altered to the effect that step 128 occurs immediately after step 122, so that the starter may then be manually placed in operation.

It is advantageous in the aforementioned starting procedure if a drive gear is engaged no later than at the end of the starter activation or a check of whether a drive gear is engaged is made, and, if not, a drive gear is engaged. This has the advantage that when shifting into a drive gear (e.g., D or P) after starting, there can be an immediate start by engaging the particular clutch and it is not necessary to wait until a gear is engaged.

As already explained, the starting gear or gears that is/are engaged or is/are to be engaged are of function of the gear last used in driving in the preceding fall cycle. This consideration of the last gear used in the starting gears, is advantageous in particular with a twin-clutch transmission according to FIG. 11 is advantageous because there the engagement of the starting gears (for example, $1^{st}$ and $2^{nd}$ gear) must occur sequentially and therefore a certain time period is needed. The first and second forward gear or a forward starting gear and reverse gear are advantageously engaged as starting gears in a twin-clutch transmission. In this way it is not necessary to wait for a gear to engage when either shifting into a forward gear or shifting into the reverse gear, and it is possible to set off immediately by engaging the clutch.

For a high starting reliability, it is advantageous when shifting the control unit into a gear to engage the clutch associated with the selected starting gear and simultaneously to release the vehicle brake or the parking lock.

Since the information about the last driving gear used is retained in particular when stopping the vehicle, it is expedient when the vehicle is at a standstill and there is a change of the setting of the control unit of the transmission, if a corresponding change of the transmission state only occurs when the setting of the control unit continues for a predetermined time period. When the selection lever is moved out of a drive gear into the park position or vice-versa, it may be the case that other drive gears and neutral are passed by the selection lever. However, this intermediate stage must be ignored; that is, if one of these intermediate stages is ever detected by the selection lever position sensors, the conversion into a corresponding gear specification command must be delayed. The delay time in this context must be selected in such a manner that the normal driver would pass the intermediate position inside this time span, e.g. 250 ms, when operating the selection lever. In this way, it is guaranteed that the transmission is quickly ready to start, and it is not necessary for the starting gear or gears first to be engaged.

Of course, the embodiments illustrated in FIGS. 9 to 12 may be changed in multiple ways, the basic ideas of the invention presented being further realized; namely, to park a vehicle provided with an automated-shift transmission, in particular a parallel-shift transmission or twin-clutch transmission, in such a manner that an unintentional rollaway is prevented, to place it in operation in such a manner that it is sets out if it is actually intended and that it may nevertheless be quickly and comfortably started because a particular starting gear is already engaged. Of course individual ideas of the invention may also advantageously be used in conventional automatic transmissions.

The expression parking lock was used in the sense of a device for holding the vehicle at a standstill. Such a parking lock may be a "classical" mechanical parking lock that blocks, for example, the transmission output shaft and is operated, for example, via a Bowden cable that leads from control unit 46 to transmission 40. Alternatively, at least to release the parking lock, an actuator may be provided that is driven by a control device. Instead of a mechanical parking lock, a parking brake actuated by at least one actuator may be provided that is part of the braking system of the vehicle. The actuator or actuators may be integrated in the transmission actuation unit, a single shift and select actuator shifting both partial transmissions and the parking lock.

Regarding features of the invention not explained above in detail, explicit reference is made below to the claims and to the drawing.

The patent claims submitted with the application are proposed formulations without prejudice to the achievement of further patent protection. The applicant reserves the right to submit claims for further combinations of features previously only disclosed in the description and/or the drawings.

The subject matter of the dependent claims may constitute separate and independent inventions in relation to the state of the art on the priority date, so the applicant reserves the right to make them the subject matter of independent claims or division declarations.

The described features may be combined with each other in different ways. The embodiments are not to be understood as a restriction of the invention.

The patent claims submitted with the application are proposed formulations without prejudice to the achievement of further patent protection. The applicant reserves the right to submit claims for further combinations of features previously only disclosed in the description and/or the drawings.

References used in dependent claims refer to the further development of the subject matter of the principle claim via the features of the particular dependent claim; they are not to be understood as a renunciation of achieving independent protection for the combination of features for the dependent claims that are referenced.

Since the subject matter of the dependent claims may constitute separate and independent inventions in relation to the state of the art on the priority date, the applicant reserves the right to make them the subject matter of independent claims or division declarations. Furthermore, they may also contain independent inventions that have a design that is independent of the subject matter of the preceding dependant claims.

The embodiments are not to be understood as a restriction of the invention. Rather, numerous amendments and modifications are possible within the context of the current disclosure, especially those variants, elements and combinations and/or materials that one skilled in the art may learn, for example, by combining individual ones together with those in the general description and embodiments in addition to features and/or elements or methodological steps described in the claims and contained in the drawings with the aim of achieving the objective and leading to a new subject matter or new methodological steps or sequences of steps via combinable features, even as far as production, testing and work procedures are concerned.

What is claimed is:

1. A method for enabling a starting operation in a vehicle equipped with an automated-shift transmission, including the following steps:
   a) checking whether ignition is on and engine off; if yes
   b) checking whether a vehicle brake or parking lock is actuated; if yes
   c) checking whether clutch is disengaged; if yes
   d) enabling of starter operation, and
   e) checking whether the vehicle moves with or after the engine turns, without a change of a driving program into a driving gear having been made; if yes
   f) cancellation of the starter operation enabling and shutdown of the engine.

2. A method for enabling a starting operation in a vehicle equipped with an automated-shift transmission, including the following steps:
   a) checking whether ignition is on and engine off; if yes
   b) checking whether a vehicle brake or parking lock is actuated; if yes
   c) checking whether clutch is disengaged; if yes
   d) enabling of starter operation
wherein, in the step in which the disengagement of the clutch is checked, in a twin-clutch transmission the disengagement of both clutches is checked.

3. A method for enabling a starting operation in a vehicle equipped with an automated-shift transmission, including the following steps:
   a) checking whether ignition is on and engine off; if yes
   b) checking whether a vehicle brake or parking lock is actuated; if yes c) checking whether clutch is disengaged; if yes
d) enabling of starter operation, wherein a starting gear is engaged no later than enabling of the starter operation.

4. A method for enabling a starting operation in a vehicle equipped with an automated-shift transmission, including the following steps:
 a) checking whether ignition is on and engine off; if yes
 b) checking whether a vehicle brake or parking lock is actuated; if yes
 c) checking whether clutch is disengaged; if yes
 d) enabling of starter operation.

wherein a starting gear is a function of a gear in which the vehicle was driven in a preceding operating cycle.

5. A method for enabling a starting operation in a vehicle equipped with an automated-shift transmission, including the following steps:
 a) checking whether ignition is on and engine off; if yes
 b) checking whether a vehicle brake or parking lock is actuated; if yes
 c) checking whether clutch is disengaged; if yes
 d) enabling of starter operation, wherein, in a twin-clutch transmission, a first and a second forward gears or a forward gear and a reverse gear are engaged no later than during enabling of the starter operation.

6. The method as described in claim 5, wherein, during shifting of the transmission into a drive gear, a clutch associated with a selected starting gear is engaged, and the vehicle brake or parking lock is released.

7. The method as described in claim 6, wherein when the vehicle is at a standstill and there is a change of a setting of a control unit of the transmission, a corresponding change of a transmission state only occurs if the setting of the control unit is maintained during a predetermined period of time.

* * * * *